(12) United States Patent
Zucknovich et al.

(10) Patent No.: US 9,444,904 B2
(45) Date of Patent: Sep. 13, 2016

(54) CONTENT DISTRIBUTION MANAGEMENT SYSTEM

(75) Inventors: Stephen Zucknovich, Wayne, NJ (US); Sai Prakash, Niantic, NJ (US)

(73) Assignee: Thomson Reuters Global Resources, Baar (CH)

( * ) Notice: Subject to any disclaimer, the term of this patent is extended or adjusted under 35 U.S.C. 154(b) by 318 days.

(21) Appl. No.: 13/422,041

(22) Filed: Mar. 16, 2012

(65) Prior Publication Data
US 2013/0246498 A1    Sep. 19, 2013

(51) Int. Cl.
*H04L 29/08*    (2006.01)

(52) U.S. Cl.
CPC .................. *H04L 67/2842* (2013.01)

(58) Field of Classification Search
CPC ............. H04L 29/08117; H04L 63/10; H04L 63/101; H04L 63/102; H04L 67/2842; H04L 67/28; H04L 67/325; H04L 67/2847; G06F 17/3089; G06F 21/31; G06F 21/6218; G06F 2221/2141
USPC ............................................ 709/227; 11/227
See application file for complete search history.

(56) References Cited

U.S. PATENT DOCUMENTS

| | | | |
|---|---|---|---|
| 6,874,015 B2 * | 3/2005 | Kaminsky | H04L 67/42 709/214 |
| 7,984,066 B1 * | 7/2011 | Kilday | G06F 21/6218 707/781 |
| 8,397,066 B2 * | 3/2013 | Krishnamoorthy et al. | 713/165 |
| 8,566,402 B2 * | 10/2013 | Cullen | G06Q 30/02 370/238 |
| 9,069,792 B1 * | 6/2015 | Craighead | G06F 17/30132 |
| 2003/0046239 A1 * | 3/2003 | Geilfuss | G06Q 30/02 705/51 |
| 2004/0117455 A1 * | 6/2004 | Kaminsky | H04L 67/42 709/214 |
| 2004/0128622 A1 * | 7/2004 | Mountain | G06Q 30/02 715/234 |
| 2007/0050467 A1 * | 3/2007 | Borrett | G06F 17/30011 709/213 |
| 2007/0089110 A1 * | 4/2007 | Li | 717/178 |
| 2008/0060084 A1 * | 3/2008 | Gappa et al. | 726/28 |
| 2008/0201711 A1 * | 8/2008 | Amir Husain | 718/1 |
| 2010/0131554 A1 * | 5/2010 | Cooper | G06F 17/30578 707/770 |
| 2011/0093925 A1 * | 4/2011 | Krishnamoorthy et al. | 726/4 |
| 2012/0072608 A1 * | 3/2012 | Peters et al. | 709/231 |
| 2013/0246560 A1 * | 9/2013 | Feng | H04L 29/0809 709/217 |
| 2014/0195622 A1 * | 7/2014 | Cullen | G06Q 30/02 709/206 |
| 2014/0304762 A1 * | 10/2014 | Puri | G06F 21/10 726/1 |

* cited by examiner

*Primary Examiner* — Vivek Srivastava
*Assistant Examiner* — Muhammad Raza

(57) ABSTRACT

Systems and methods are disclosed for managing the data flow from a publisher entity to a consumption entity, which may be a user, system or device. The publisher entity generates and transmits entitled data to a content management server along with a set of permissions associated with the consumption entity for access to the data. Upon receiving a request for entitled data from a consumption entity, the content management server retrieves the requested data from a cache and transmits at least a subset of the cached data matching the consumption entity's permissions.

28 Claims, 9 Drawing Sheets

| | |
|---|---|
| Publication dataset registration | |
| Publication Server Name | PubServer1 |
| Data Set | Organizations |
| Data Set Size | 2.5 MBytes |
| Data Set Id | 12345 |
| Number of files | 2 |
| Publication date | 1 / 1/ 2011 |
| Data Set Version | 1.1 |
| Frequency | Daily |
| Production Time | 00:00:00Z |
| Production Location | DC1 Nutley, NJ |
| Production Time Zone | -5 |
| SLA | 15 minutes |
| Escalate | ops@mycompany.com<br>snmpset -v 2c -c PubServer1/Organizations test.net-snmp.org ucdDemoPublicString.0 s "Failed to receive" |
| Overall Permissions | 3 |
| Aggregated permissions | 1,2,3 |
| File1 Content | Names |
| File1 Name | Organization.Names |
| File1 Permissions | <null> |
| File1 Type | Initialization |
| File1 Format | XML |
| File1 Schema | www.xyz.com/OrganizationNames.xsd |
| File2 Content | Identifiers |
| File2 Name | Organization.Identifiers |
| File2 Permissions | 1,2 |
| File2 Type | Initialization |
| File2 Format | XML |
| File1 Schema | www.xyz.com/OrganizationIdentifiers.xsd |

FIGURE 5

| Consumer dataset registration | | |
|---|---|---|
| Consumer Server Name | | SubServer1 |
| Data Set | 1 | Organizations |
| | Registration date | 1 / 1/ 2011 |
| | Data Set Version | 1.1 |
| | Frequency | Daily |
| | Consumption Time | 02:00:00Z |
| | Production Location | DC2 Hartland, WI |
| | Production Time Zone | -6 |
| | Backup Location | DC4 Docklands, London |
| | Production Time Zone | 0 |
| | Backup Online | Yes |
| | Backup Active | No |
| | SLA | 15 minutes |
| | Escalate | ops@mycompany.com snmpset –v 2c –c PubServer1/Organizations test.net-snmp.org ucdDemoPublicString.0 s "Failed to fetch" |
| | Permissions | 1,2,3 |
| Data Set | 2 | Quotes |
| | Registration date | 1 / 2/ 2011 |
| | Data Set Version | 1.0 |
| | Frequency | 15 min |
| | Consumption Time | 01:00:00Z |
| | Production Location | DC2 Hartland, WI |
| | Production Time Zone | -6 |
| | Backup Location | DC4 Docklands, London |
| | Production Time Zone | 0 |
| | Backup Online | Yes |
| | Backup Active | No |
| | SLA | 5 minutes |
| | Escalate | ops@mycompany.com snmpset -v 2c -c PubServer1/Organizations test.net-snmp.org ucdDemoPublicString.0 s "Failed to fetch" |
| | Permissions | 1,2,3 |

FIGURE 7

| Publication Registration Table | | | | | | | |
|---|---|---|---|---|---|---|---|
| Data Center | Data Set | Version | Publishing Application Server | Backup Publishing Application Server | Data | Frequency (Minutes) | Permissions |
| 1 | 1 | 1.0 | A | AA | See Figure 5 | 15 | 1 |
| 1 | 1 | 1.1 | A | AA | See Figure 5 | 5 | 1 |
| 1 | 3 | 2.1 | A | AA | See Figure 5 | 5 | 1 |
| 1 | 2 | 2.0 | B | BB | See Figure 5 | 1 | 1 |
| 2 | 4 | 1.0 | C | CC | See Figure 5 | 30 | 2 |
| 3 | 5 | 1.0 | D | CC | See Figure 5 | 30 | 3 |

| Consumer Registration Table | | | | | | | |
|---|---|---|---|---|---|---|---|
| Data Center | DataSet | Version | Consumer Application Server | Backup Consumer Application Server | Data | Frequency (Minutes) | Permssions |
| 2 | 2 | 2.0 | X | XX | See Figure 7 | 20 | 1,2,5,6 |
| 2 | 5 | 1.0 | X | XX | See Figure 7 | 5 | 1,2,5,6 |
| 3 | 1 | 1.1 | Y | YY | See Figure 7 | 3 | 1,3 |
| 3 | 3 | 2.1 | Y | YY | See Figure 7 | 45 | 1,3 |
| 3 | 1 | 1.1 | Z | ZZ | See Figure 7 | 30 | 1,4 |
| 3 | 5 | 1.0 | Z | ZZ | See Figure 7 | 30 | 3,4 |

| Routing Table | | | | | | | | |
|---|---|---|---|---|---|---|---|---|
| Pub Data Center | Publishing Application Server | Data Set | Version | Consuming Data Center | Consuming Application Server | Frequency | SLA | Active | Comments |
| 1 | A | 1 | 1.1 | 3 | Y | 15 | 20 | Y | |
| 1 | A | 1 | 1.1 | 3 | Z | 15 | 20 | Y | File is not copied, already copied from line above |
| 1 | B | 2 | 2.0 | 2 | X | 5 | 5 | Y | |
| 1 | A | 3 | 2.1 | 3 | Y | 5 | 5 | Y | |
| 2 | C | 4 | 1.0 | Not copied, no consumers, alert publisher | | | | | |
| 3 | D | 5 | 1.0 | 2 | X | 30 | 5 | Y | |
| 3 | D | 5 | 1.0 | 3 | Z | 30 | 5 | Y | |

| Content management Server File Copies | | | |
|---|---|---|---|
| Publishing Content Management Server | Consuming Content Management Server | Data Set | Version |
| 202 | 204 | 1 | 1.1 |
| 202 | 203 | 2 | 2.0 |
| 202 | 204 | 3 | 2.1 |
| 204 | 203 | 5 | 1.0 |
| 204 | 204 | 5 | 1,0 |

FIGURE 8

| File requires a User having a pernmission of at least one of ||| File delivered to this user ||
|---|---|---|---|---|
| Data record permissions ||| User Permission 1,4 ||
| Record | Data | Permissions | Record | Data |
| 1 | <data> | 1,2 | 1 | <data> |
| 2 | <data> | 1,2 | 2 | <data> |
| 3 | <data> | 1,2,3 | 3 | <data> |
| 4 | <data> | 2,3 | | Note record is not supplied to user with permssion 1,4 |
| 5 | <data> | 1,2,4 | 5 | <data> |
| 6 | <data> | 1,4 | 6 | <data> |

FIGURE 9

CONTENT DISTRIBUTION MANAGEMENT SYSTEM

TECHNICAL FIELD

The present invention relates to electronic storage and distribution of information, and more particularly, to computer-based systems and methods for the storage and distribution of information to authorized recipients.

BACKGROUND

Global computer networks, such as the Internet, enable information to be distributed to a wide range of people at locations around the world. One of the advantages of the Internet is that the communication protocols used are non-proprietary, thus enabling end users to access and use the Internet without the need for customized hardware or software. Many different industries use computer networks as a way to provide their customers with quick access to vast amounts of data. In these industries, the speed at which both secure and non-secure data is provided to remote users is of utmost importance and is often an area of distinctiveness for businesses. In some instances, the businesses utilize FTP (File Transfer Protocol) and/or HTTP (Hypertext Transfer Protocol) servers that communicate with a Content Distribution Management System for distribution of information. The Content Distribution Management System can include a plethora of content management servers that store data at a location close to consumption entities, such as consumers, businesses, and devices (e.g., consumption application servers). Typically, the consumption entities retrieve data from content management servers by checking if new data has arrived from time to time.

Content management servers are typically configured close to one or more publication entities, such as individual publishers, business publishers, and devices (e.g., publication application servers). Often, publication application servers are located in different geographies and locations that facilitate data collection for publication without regard to where consumption entities are located. Thus, there tends to be a plethora of content management servers with specific content that are disbursed throughout these systems at locations based at least in part on the geographic location of publisher entities.

Various problems can arise with such configurations. For example, in large enterprise organizations or an organization serving a large dispersed population of systems or users, there are many different geographic regions or data centers, each with their own ability to host computer based systems needing timely access to data produced elsewhere in the organization. Typically, these computer based systems poll one or more content management servers for the data it desires and subsequently downloads that data from one of the content management servers if it is present. This results in the same data being accessed from non-cache memory and then copied multiple times from a same content management server, which is inefficient.

In addition, with a large number of consumption entities interested in same data, each consumption entity determines when to download newly arriving data from one or more content management server. This results in consumption entities tending to continually poll content management servers to determine if new content has arrived, which is inefficient use of computer resources.

Further, with multiple content management servers configured in these systems, it is difficult for consumption entities to determine what data on which content management server is available and should be downloaded. It is also increasingly difficult for consumption entities to determine which one of the multiple content management servers to access to retrieve data of interest.

Accordingly, there exists a need for improved systems and techniques for storing and distributing information to consumption entities.

SUMMARY

Systems and techniques relating to a Content Distribution Management System for managing and distributing entitled information are disclosed. The Content Distribution Management System distributes entitled data efficiently on one or more content management servers in a resilient fashion. The system provides efficient access and delivery of data, ensures that data is distributed using only a single copy of the data between content management servers, and manages the availability of data based on a lifetime of the data assets themselves.

According to one aspect of the invention, a computer server includes a processor and a memory. The memory is configured to include a first set of registrations and a second set of registrations both of which are stored in a non-cache portion of the memory. The first set of registrations relates to a set of publications. Each of the set of publications includes a set of permissions, a set of frequency update information, and a set of meta-data associated with a publisher data set. The publisher data set also includes a set of entitled components and a link to the set of permissions.

The second set of registrations is stored in the non-cache portion of the memory and relates to a set of registrations of interest from consumers. Each of the set of registrations of interest identifies the publisher data set, frequency of access of the data, permissions the consumer possesses, and is associated with a set of consumption entities. A cache is also included in the memory for receiving the publisher data set. The computer server also includes means for determining whether to transmit at least one portion of the publisher data set prior to the publisher data set being sent to a consumer.

In another aspect, a computer-implemented method includes receiving a publisher data set from a publication application server, wherein the publication data set includes a set of identifiers associated with a set of consumption entity permissions, and caching the publication data set in a cache portion of a memory. The method also includes receiving a request for at least a portion of the publisher data set from one of a set of consumption entities, comparing the request to the set of consumption entity permissions, and transmitting at least a portion of the publisher data set based on the comparison.

In another aspect, a computer-implemented method includes receiving a publisher data set from a publication application server, wherein the publication data set includes a set of identifiers associated with a set of consumption entity permissions, and caching the publication data set in a cache portion of a memory. The method also includes receiving a request for at least a portion of the publisher data set from one of a set of consumption entities, comparing the request to the set of consumption entity permissions, and transmitting at least a portion of the publisher data set based on the comparison.

In yet another aspect, a computer-implemented method includes receiving a first data request, wherein the first data request is associated with a first consumption entity associated with a first set of permissions, determining if first data responsive to the first data request and satisfying the first set of permissions is stored in a local data cache, and transmitting the first data to the first consumption entity if the first data is stored in the local data cache. The method also includes receiving a second data request corresponding to a second consumption entity associated with a second set of permissions, the second data request being the same as the first data request and the second set of permissions different from the first set of permissions, determining if second data responsive to the second data request and satisfying the second set of permissions is stored in the local data cache, and transmitting the second data to the second consumption entity if the second data is stored in the local data cache, wherein the second data is different from the first data.

In one embodiment, a content distribution management system includes a content management server that caches data close to an entry point of a consumption entity's network. The ability to cache and store data in a location close to the consumption entity's network allows the number of users and user requests to increase without increasing the number of content management servers providing the data. In addition, the location of a content management server near the entry point of the consumer's network decreases the time it takes to transmit data to consumption entities because the transfer of data to the content management server is usually done prior to a consumer's request for data. Additionally, multiple consumption entities can share the same cached data, thus leveraging the data that is sent only once to the content management server.

The content distribution management system may allow content to be downloaded by a consumption application server using a variety of methods, some of which use known protocols such as HTTP, HTTPS, FTP, FTPS, and SFTP, and file access protocol such as CIFS, NFS and others. The variety of protocols available allow a choice by the consumption application server to suit the technology employed within that system as well as satisfying performance criteria for the data transfers. An example of another protocol that may be used is BitTorrent, which would leverage multiple content management servers. In another embodiment, a client side API is distributed to publication application servers or consumption application servers or both to implement the data copy protocol either using standard protocols or private ones. The use of the API may result in the avoidance of materializing the data as a file to affect the transfer of data. In addition, use of the API may allow the transfer of data to occur using parallel transfer mechanisms to reduce the time required to transfer the data from the client side to the content management server or vice-versa.

In one embodiment, the content distribution management system allows a consumption application server to register its existence in the system, a process hereinafter referred to as a consumption registration, identify the type of publisher data sets in which the consumption application server is interested, the version of those publisher data sets, the frequency of update that the publisher data sets will be used by the consumption application server, and the location of an alternate consumption application server which would operate as a backup in the event a current consumption application server fails, is offline, or is impaired. Other registration data may also be supplied and stored as well. The consumption registration data is made available to a content management server in which a publication application server is connected to implement a routing algorithm in order to minimize the number of copies of the data that are made to bring the data to the location of the content management server closest to this consumption application server. Advantageously, this may ensure that the same publisher data sets are never copied more than once between any two content management server systems. The registration of the publisher data sets does not require that the consumer understand where the publisher is publishing from.

In one embodiment, the content distribution management system, using the consumption registration data from the consumption application servers, accesses the permissions of the published data to determine routing of the publisher data set and whether the publisher data set is to be routed to the content management server in communication with the consumption application server registered for the published data and is permissioned to access at least a portion of it.

In one embodiment, the content distribution management system uses the consumption registration data to implement a data retention policy and therefore determine when to remove the publisher data set after its last use has been determined.

In another embodiment, the content distribution management system uses the consumption registration data to monitor the actual downloads of data by consumption application servers and notify operational personnel when a consumption application server fails to perform the download with a specified time window, as specified in a Service Level Agreement (SLA).

In yet another embodiment, the content distribution management system, uses the consumption registration data to notify a consumption application server of newly arriving publisher data so that it can be downloaded with a minimum of delay or no delay at all. Advantageously, the notification serves to speed up the propagation of data through the system and enables adherence to any consumption application server SLA requirements to download the publisher data set within a certain time window after publication.

The content distribution management system may also allow a publisher entity, such as a publication application server, to register its existence. The publication registration identifies the type of data sets or files it will publish, the frequency of publication with which the data will be produced, and the location of an alternate publication application server which would operate as a backup in the event the publication application server should fail, is impaired, or is offline. The publication registration data is utilized by a routing algorithm of a content management server that ensures that minimal copies of the publisher data are made for distribution. Use of the routing algorithm ensures that the same published data is not copied more than once between any two content management servers and also allows for determining which publisher data set is available on the system by consumption application servers.

In one embodiment, the content distribution management system is configured to receive entitled data from a publication application server and cache the received data. The entitled data may have associated data permissions corresponding to at least one consumption application server authorized to access the content management server. The content management server may cache the entitled data and store the entitled data and a related identifiers (e.g., links) corresponding to the associated data permissions of the entitled data in a cached portion of the memory. The content management server may retrieve the consumption application server permissions corresponding to a specific use of the entitled data by that system from a non-cache portion of the memory and determine if those consumption application server permissions correspond with the associated data permissions of the cached entitled data. If the consumption application server permissions correspond with the associated data permissions of the cached entitled data, the content management server may transmit at least a subset of the cached entitled data to the consumption entity.

For example, in one embodiment, the content distribution management system transmits only the portion of data from a publisher data set that a consumption application server has permissions for.

The content distribution management system may allow for the simultaneous use of different versions of the publisher data set by different consumption entities. The different versions may be individually addressable by consumption application servers and can be received from or transmitted to one or more publishing and consumption application servers respectively. Advantageously, this arrangement provides a mechanism by which consumption entities may easily upgrade to a more recent version of published data by registering for a different version of the publisher data sets.

In yet another embodiment, the content distribution management system maintains an audit log of when publisher data sets are created, which consumption application servers they are routed to, and when publisher data sets were transmitted to or accessed by consumption entities.

Other features and advantages of the invention will become apparent to those skilled in the art upon review of the following detailed description, claims and drawings in which like numerals are used to designate like features.

BRIEF DESCRIPTION OF THE DRAWINGS

FIG. 5 is a table containing example data corresponding to a publication application server registration.

FIG. 7 is a table containing example data corresponding to a consumption application server registration.

FIG. 8 illustrates example data corresponding to a routing table included in the content distribution management system of FIG. 1.

FIG. 9 illustrates an example file layout of a publisher data set including permissions.

Like reference symbols in the various drawings indicate like elements.

Figure 1:
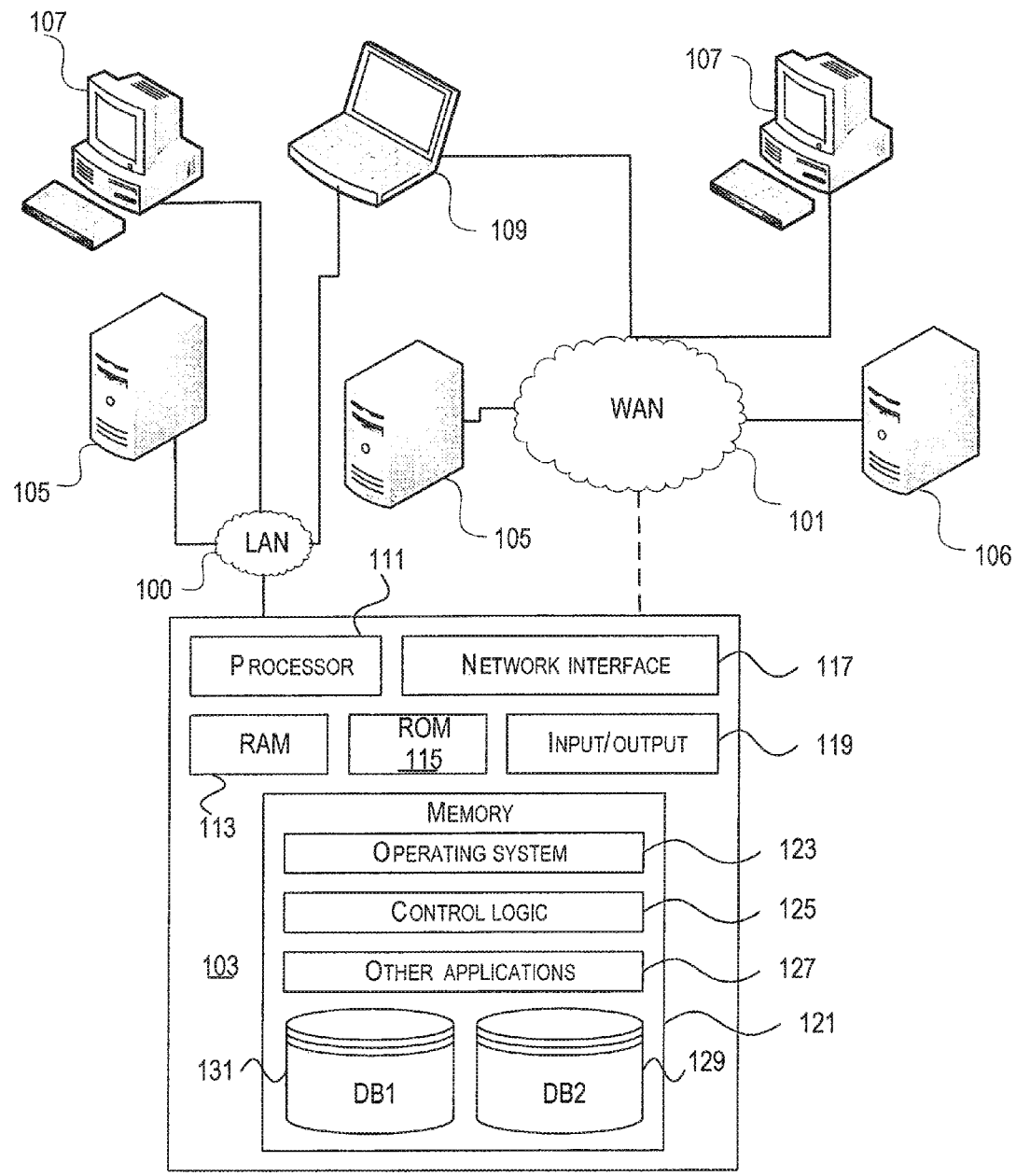
FIG. 1 illustrates an example network architecture and devices included in a content distribution management system in accordance with certain embodiments of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. Rather, the phrases and teens used herein are to be given their broadest interpretation and meaning. The use of "including" and "comprising" and variations thereof is meant to encompass the items listed thereafter and equivalents thereof as well as additional items and equivalents thereof.

DETAILED DESCRIPTION

FIG. 1 illustrates one example of a network architecture and data processing device that may be used to implement one or more illustrative aspects of a content distribution and management system. As shown in the FIG. 1 example, various network devices 103, 105, 106, 107, and 109 may be interconnected via a wide area network (WAN) 101, such as the Internet. Other networks 100 may also or alternatively be used, including private intranets, corporate networks, LANs, wireless networks, personal networks (PAN), and the like. As shown in FIG. 1, networks 100 and 101 are for illustration purposes and may be replaced with fewer or additional computer networks. The local area network (LAN) 100 may have one or more of any known LAN topology and may use one or more of a variety of different protocols, such as Ethernet. Devices 103, 105, 106, 107, 109 and other devices (not shown) may be connected to one or more of the networks via twisted pair wires, coaxial cable, fiber optics, radio waves or other communication media.

Content management servers are typically used by content providers to provide and distribute information. Consumption entities, such as consumers and businesses interested in data, typically utilize computer devices, such as consumption application servers, to access and process information of interest from content management servers. Publisher entities, such as publishers, typically utilize computer devices, such as publication application servers, to distribute information.

The term "network" as used herein and depicted in the drawings refers not only to systems in which remote storage processing devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

As shown in the FIG. 1 example, components may include one or more content management servers 103, application publication servers 105, consumption application servers 106, and client computers 107, 109. Publication application server 105 is a typical user of the invention and may in fact be a web server, a file transfer protocol (ftp) server, a file server, or other combinations. The publication application server 105 may produce data and/or files for transmission for use by any connected network device and in particular by one or more consumption application server 106. Content management server 103 provides overall access, control and administration, of databases and control software for performing one or more illustrative aspects of the invention as described herein.

Content management server 103 may be connected to the publication application server 105 through which data is received for transmission to network devices 107,109 and/or consumption application server 106. Alternatively, content management server 103 may act as a web server, an ftp server, or a file server itself and be directly connected to the network, including the Internet. Content management server 103 may be connected to publication application server 105 and/or consumption application server 106 through the network 101 (e.g., the Internet), via direct or indirect connection, or via some other network. Users may interact with the content management server 103 using remote computers 107, 109, e.g., using a web browser to connect to the content management server 103 or via one or more externally exposed web sites hosted by publication application server 105 and/or consumption application server 106. Client computers 107, 109 may be used in concert with content management server 103 to access data stored therein, or may be used for other purposes. For example, from client device 107 a user may access a web server on the consumption application server 106 using an Internet browser, as is known in the art, or by executing a software application that communicates with consumption application server 106 and/or content management server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by consumption application server 106 and content management server 103 may be combined on a single server. A further example may be there are several content management servers 103 acting together to provide horizontal scale.

Each component 103, 105, 106, 107, 109 may be any type of known computer, server, or data processing device. Content management server 103, e.g., may include a processor 111 controlling overall operation of the content management server 103. Content management server 103 may further include RAM 113, ROM 115, network interface 117, input/output interfaces 119 (e.g., keyboard, mouse, display, printer, etc.), and memory 121, including a cache portion and a non-cache portion. The network interface 117 may transmit and receive signals using one or more protocols and is one example of a structure of means of transmitting. I/O 119 may include a variety of interface units and drives for reading, writing, displaying, and/or printing data or files.

Memory 121 may further store operating system software 123 for controlling overall operation of the data processing device 103, control logic 125 for instructing content management server 103 to perform aspects of the invention as described herein, and other application software 127 providing secondary, support, and/or other functionality which may or may not be used in conjunction with aspects of the present invention. The control logic 125 may also be referred to herein as the content management server software 125. Functionality of the content management server software may refer to operations or decisions made automatically based on coded rules included in the control logic 125, made manually by a user providing input into the system, and/or a combination of automatic processing based on user input (e.g., queries, data updates, etc.).

Memory 121 may also store data used in performance of one or more aspects of the invention, including a first database 129 and a second database 131. In some embodiments, the first database may include the second database (e.g., as a separate table, report, etc.). That is, the information can be stored in a single database, or separated into different logical, virtual, or physical databases, depending on system design. One or more devices 105, 106, 107, 109 shown in FIG. 1 may have a similar or different architecture as described with respect to the content management server 103. In addition, those of skill in the art will appreciate that the functionality of the devices as described herein may be spread across multiple data processing devices, for example, to distribute processing load across multiple computers, to segregate transactions based on geographic location, user access level, quality of service (QoS), etc.

One or more aspects of the invention may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 2:
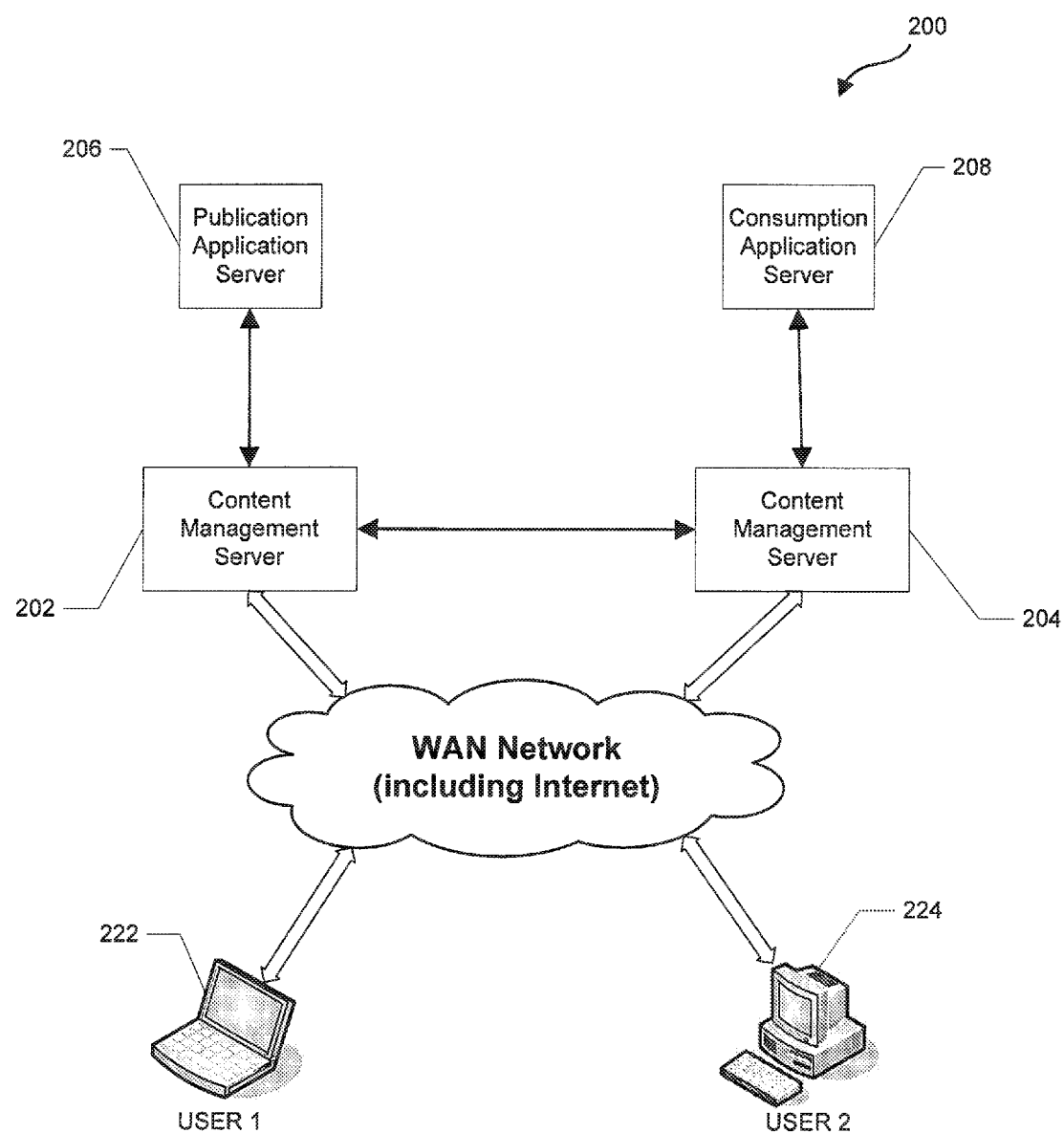
FIG. 2 illustrates example components of the content distribution management system shown in FIG. 1.

Referring now to FIG. 2, an illustrative embodiment of a content distribution management system 200 is shown. The content distribution management system 200 may include one or more content management servers 202, 204, which is shown as content management server 103 in FIG. 1, one or more publication entities, such as publication application server 206, and one or more consumption entities, such as consumption application server 208. The content management servers 202, 204 may be any type of computer server designed to store and cache data for delivery to consumption entities, and may be separate from the publication application server 206 and the consumption application server 208. In one embodiment, for example, one of the content management servers 202 is an edge device that is located at the edge of the computer resources (e.g., computer network) of publisher entities and/or consumption entities, and is an entry point for data consumption entities into the data provider's network. By caching data at the edge of the computer resources, at a location closer to the data consumption entity than the publisher entity (e.g., publication application server 206), time and cost savings may result from transmitting data to consumption entities from one of the content management servers 202, 204 rather than requesting the data from a publication application server 206 each time a data request is made. Advantageously, by removing the need to request and receive data from the publication application server 206, the delivery time of data to a consumption entity may be decreased. Furthermore, the load from numerous requests for data from the publication application server 206 may be reduced, potentially resulting in increased performance and system reliability.

In one embodiment, the content management servers 202, 204 communicate with a publication application server 206 that contains entitled data. Entitled data refers to data that is maintained securely so that access to certain entitled data components may be restricted to certain consumption entities. In one embodiment, consumption entities are associated with a set of permissions (i.e., entitlements) which determine consumption entity access to different data in the system. Users may be entitled to access and receive an entire publisher data set or only specific parts of data within the publisher data set. Additionally, entitled data may require that a consumption entity's permissions be verified prior to transmitting the entitled data or a portion thereof to the consumption entity. For example, in one embodiment, entitled data is financial transaction data. Each time a consumption entity requests data, the permissions associated with the consumption entity are verified with a publication application server 206 that published the data, prior to transmitting the entitled data to the user. In at least one embodiment, the content management server 202, 204 includes publisher data sets that are both entitled and temporal. Temporal data refers to data that may change, or may have multiple different values over a time interval. For instance, temporal data may be a company stock price that has different values at different times throughout the day, week, month, year, etc.

The publication application server 206 may store consumer permissions for multiple different consumption entities and/or groups of consumption entities on the system, and may retrieve a set of consumption entity permissions in response to a query from a content management server 202, 204 or a consumption application server 208 identifying one or more consumption entities of the system. For example, a consumer may have permissions to view an entire data set, specific rows and/or columns of data sets only, or certain sections of a data set while not having permissions to view others. In another example, a consumer may belong to one or more groups, (e.g., customers, brokers, administrators) so that all consumers of the group may have permissions that allow the consumers to view specific data (e.g., stock data, customer data). When consumption entities send requests for data to the system, the consumer(s) identities may be determined from consumer identification and/or authentication information contained in the data requests. In one embodiment, for example, the publication application server 206 provides the set of permissions required to access the data from the content management server 202, 204. The publication application server 206 may also communicate the set of permissions to the consumption application server 208. The content management server 202, 204 may transmit both the entitled data and the set of permissions to the consumption application server 208. In certain examples, the publication application server 206 may be a separate device from the consumption application server 208 and the content management server 202, 204. Alternatively, the publication application server 206 may be physically located within a secure portion of either the content management server 202, 204 or the consumption management server 208. In certain implementations, due to the secure nature of consumer permissions, it might not be desirable to transmit consumer or consumer group permission data over a public network or another unsecure computer network. Therefore, secure computer networks and/or encryption may be used to transmit permission data to and from the publication application server 206 and servers 202, 204, 208. Additionally, other security measures may be implemented during the transmission of data, such as not transmitting a set of consumption permissions in the same data transmission as the consumption entity's identity.

Figure 3:
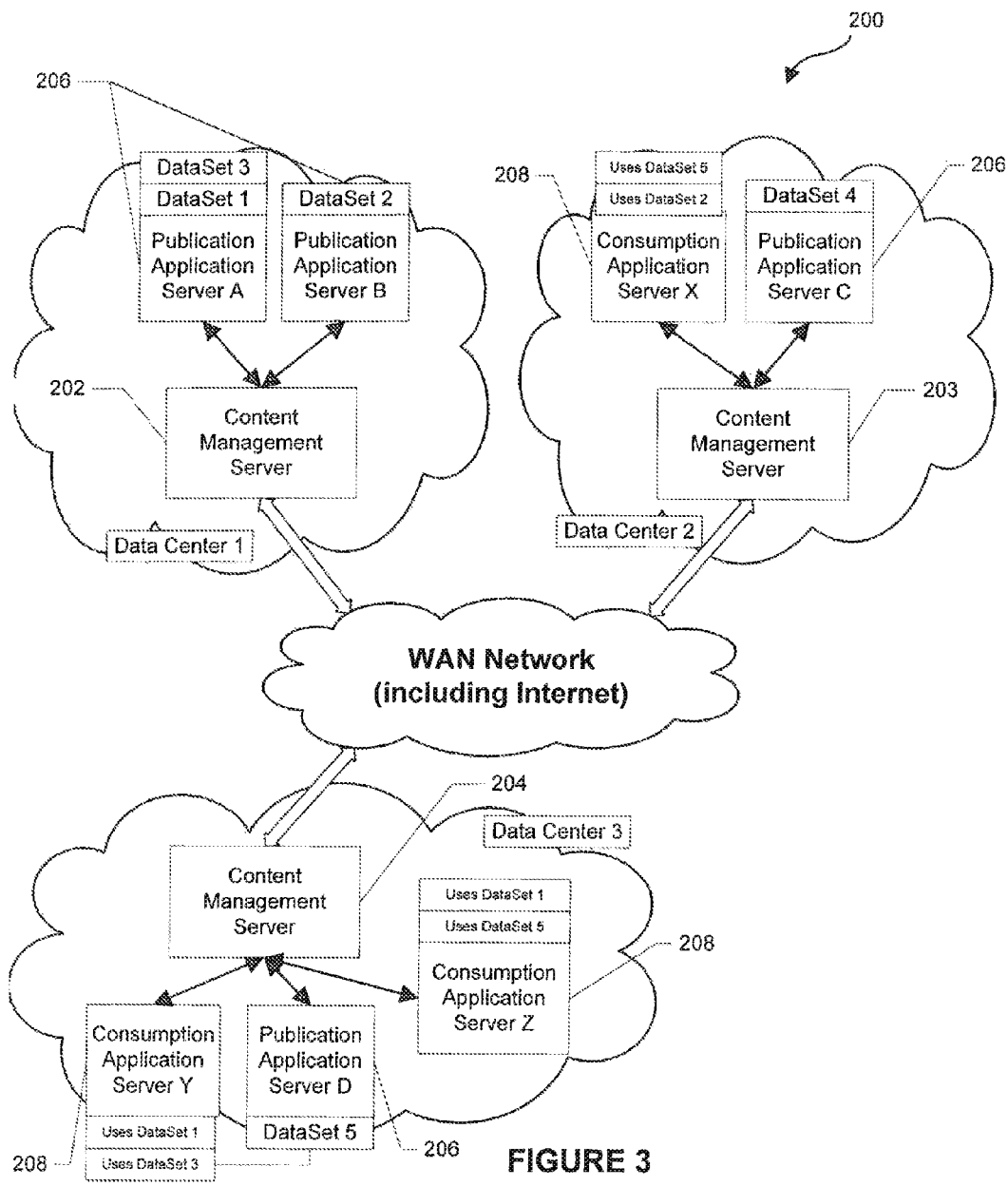
FIG. 3 illustrates additional example components of the content distribution management system shown in FIG. 1.

Turning now to FIG. 3, the content management servers 202, 203, 204 may maintain an inventory of a plurality of publisher data sets from publisher entities, such as the publication application servers 206. There may be multiple publication application servers 206 each having a plurality of publisher data sets and each publisher data set having zero or more different versions. In one embodiment, the publication application server 206 registers each publisher data set it will publish, along with attributes including required permissions that are needed to receive the publisher data set, the frequency of publication, and the manner in which the data will be published. Some of this data is associated with a publication registration which may be published as initialization files, change files, or incremental summary update files as well as other types of data sets and files. FIG. 5 illustrates example data included in a publication registration. In operation, the content management servers 202, 203, 204 may receive publication registrations and store the same in non-cache memory so that consumption application servers 208 can interrogate and thereafter, subscribe to receive the publisher data sets. As shown in the FIG. 3 example, the publication application server 206 may be located in different geographies and connect to different content management servers 202, 203, and 204. All content management servers 202, 203, 204 are aware of each other and communicate updates of information to each other. In one embodiment, each instance of the content management server in different geographies maintains a single global list of publication application servers 206 registered and along with each of their published data sets, as well as details about the publisher data sets they publish by communicating between the content management servers 202, 203, 204. Each instance of the content management server in different geographies also maintains a single global list of consumer application server 208 registered and along with each of their consumed data sets, and details concerning the publisher data sets they consume by communicating between the content management servers.

The publication application server 206 registers each publisher data set it will publish and attributes concerning those data sets. One attribute is the location of a backup publication application server 206 and a service level agreement (SLA) for the publication of its data sets. The SLA describes the minimum time period in which the publication application server 206 should provide its declared data sets at the frequency indicated. The backup server may be available in a different locale to provide resiliency of data provision in the event of a local outage. The content management servers 202, 203, 204 are aware of each backup publication application server and may use data from the backup publication application server in the event the main publication application server is unable to provide the data required within a prescribed SLA. Advantageously, this feature may allow consumption entities to be unaware that a publication application server is impaired, failed, or offline in a particular location since the arrival of the expected data occurs from the backup publication application server.

As noted previously, the publication application server 206 registers each data set it will publish and attributes relating to those data sets. One attribute is the version of the publisher data set. The publication application server may publish different versions of a publisher data set as improvements and additions become available to that data set. As a result, in one embodiment, the content management server controls the version of the publisher data set and provides those versions to the consumption application servers as different and distinct data sets. Further, part of the publication application server registration for a publisher data set may include versioning information effectively making the publisher data set unique.

Advantageously, the content management servers 202, 203, 204 allow publication management servers 206 to publish any number of publisher data sets. These publisher data sets may include one or more files. The protocol to publish the data set can be HTTP, HTTPS, FTP, SFTP, FTPS and file protocols such as CIFS, NFS as well as others as new protocols are invented. There may also be a client side API that executes on the publication application server that allows the publication application server 206 to publish files directly to the content management servers 202, 203, 204. This feature prevents the writing of a file on the publication application server 206 first and then copying that file to the content management server 202, 203, 204 and then removing the original file. As such, publisher data sets are written only once on content management servers 202, 203, 204 yielding a better performance throughput for publishing. In another embodiment, the published data set does not exist as a file at all anywhere, but is provided using inter-server communication and storage in memory. In yet another embodiment, further optimization is achieved by making use of multiple simultaneous network connections to distribute the file in chunks in parallel with reassembling on the server end, thus allowing for copying over high latency lines quickly. A similar technique may be used by consumption application servers 208 when fetching or downloading publisher data sets of interest from a content management servers 202, 203, 204.

Referring back to FIG. 2, the content management servers 202, 204 may communicate with a consumption application server 208 that requires multiple publisher data sets from a different publication application server 206. In one embodiment, consumption application server 208 only requests entitled data to which that consumption application server 206 is allowed to process and use, based on a set of permissions defining the use. As noted previously, entitled data refers to data included in a publisher data set that is maintained securely so that access to certain components of the data may be restricted to certain users. In some examples, consumption entities have associated sets of permissions (i.e., entitlements) which determine their access to different data in the system. For instance, users may be entitled to see an entire data set or only specific parts of data within the data set. Additionally, entitled data may require that a consumption entity's permissions be verified prior to transmitting the entitled data to the consumption entity. For example, in one embodiment, the entitled data includes financial transaction data. Each time a consumption entity requests data, the permissions associated with the entity are verified with a publication application server 206, prior to transmitting the entitled data to the user. In at least one embodiment, the content management server 202, 204 contains data that is both entitled and temporal. Temporal data refers to data that may change, or may have multiple different values over time. For instance, temporal data may be a current company stock price.

Referring to FIG. 3, in one embodiment, content management servers 202, 203, 204 are configured to maintain an inventory of a plurality of publisher data sets used by one or more consumption application server 208. There may be multiple consumption application servers 208 each using the same or different publisher data sets. The publisher data sets in turn may originate or be derived from many different publication application servers 206.

FIG. 7 shows an example consumption data set registration provided by a consumption entity, such as consumption application server 206. The consumption data set registration includes a set of registrations of interest identifying one or more publisher data sets. In one embodiment, for example, the consumption application server 206 registers each publisher data set it will use, along with attributes including required permissions that are needed to receive the publisher data set, the frequency of consumption, and the nature of how the publisher data set will be processed. The consumption data set registration can be consumed as initialization files, change files, or incremental summary update files, as well as other types of files. The content management servers 202, 203, 204 receive this registration and store it for use in executing a routing algorithm to route the publisher data set from the publication application server 206 to the consumption application server 208. The consumption application server 208 may interrogate and subscribe to receive the publisher data sets based on a set of permissions that the consumption application server has available to it. The consumption application server 208 may be located in different geographical locations and connect to different content management servers 202, 203, and 204. The content management servers 202, 203, 204 communicate with one another. In one embodiment, each instance of the content management servers in different geographical locations maintains a single list that indicates one or more consumption application server 208 registered to receive the publisher data set, along with each of the published data sets required to be delivered to the consumption application server 208, and details concerning what publisher data set the consumption application server is to consume by communicating among the content management servers 202, 204, 204.

The consumer application server 208 registers each publisher data set in which it has identified an interest and attributes concerning publisher data sets. In one embodiment, for example, one attribute is the location of a backup consumer application server 208 and a service level agreement (SLA). The SLA may describe the minimum time windows in which the consumption application server 208 needs to access its declared publisher data sets at the frequency indicated. The backup consumption application server 208 is available in a different locale to provide resiliency of data consumption in the event of a local outage. In one embodiment, content management servers 202, 203, 204 are configured to be aware of each backup publication application server 206, and may use publisher data sets from that backup publication application server in the event the main publication application server is unable to consume the data required within a prescribed SLA time period. This feature allows publisher entities to be unaware that a consumption entity, such as a consumption application server, is offline in a particular location as the delivery of the expected publisher data still occurs to a backup consumption application server. Advantageously, the content management servers 202, 203, 204 allow consumption entities to only be concerned about the data they require, and not be concerned with ensuring that a backup publication application server is in synchronization or how to receive data from the backup publication application server.

In one embodiment, the content management servers 202, 203, 204 compute a time period in which publisher data sets are to be available so that an arbitration may occur between publication application servers, given a publication frequency, consumption application servers, and consumption frequency. In one embodiment, this is accomplished by both publication application server 206 and consumer application server 208 providing their service level agreements during registration processes.

One result of this arbitration process is that components of the system may implement a data retention policy. For example, in one embodiment, the content management servers 202, 203, 204 store the published data sets from the publication application server 206 in a cache portion of memory until all consumption entities have consumed the data and a configurable pre-determined amount of time per publisher data set has elapsed, allowing consumption entities to reacquire the data in the event of a processing issue. After the pre-determined period of time has passed, the publisher data set is deleted. This relieves the publication application server 206 from storing the publisher data set after it is transmitted to the content management servers 202, 203, 204. Once transmitted, the publisher data set is available to all consumption application servers 208 as indicated in their individual SLAs regardless of any state the publication application server 206 may enter after the publication of the data set occurs.

In one embodiment, content management servers 202, 203,204 are notified by a publication application server 206 that a publisher data set previously registered is available for distribution. The publisher data set is transferred to the content management servers 202,203,204 via one or more mechanisms described previously. This notification facilitates transmitting the publisher data set to other content management servers 202, 203, 204 and ultimately consumption application servers 208 with a notification that the publisher data set is available for immediate access.

In one embodiment, content management servers 202, 203, 204 are aware of all publisher data sets and the location of every consumption application server 208 in which publisher data sets are to be accessed and/or transmitted. As such, a consumption application server may request during the consumption data set registration process that the consumption application server be notified on the arrival of one or more publisher data sets. Typically in the art, consumption entities poll a data provider repeatedly to determine if there is newly arrived data. The affect of this polling is to add delay in processing new data on average, one-half (½) the poll time. Aspects of the present system speed the results, reduce the processing overhead of content management servers and thus increase the number of publication and consumption application servers 206,208 that content management server can serve. The notification may be implemented as a callback using a client side API, web service call, or message.

In one embodiment, the content management servers 202, 203, 204 are aware of each publisher data set provided by one or snore publication application server 206, as well as when the publisher data set was published and which consumption application servers 208 accessed it over the network. As a result, the content management servers 202, 203, 204 may be configured to report a detailed audit trail showing the logical and physical route taken for each publication entity/consumption entity relationship, including time for transfer, duration to publish, duration to process for each consumption entity, and total wait time for consumption entities to process. Advantageously, the audit trail may be invaluable for debugging and tracing the flow of data throughout the system, including discovering quicker paths through the network.

Referring now to FIGS. 3 and 8, in one embodiment, the content management servers 202, 203, 204 are configured to route particular publisher data sets to content management servers 202, 203, 204 associated with one or more consumption application server 208 having an identified interest. The content management servers 202, 203, 204 may guarantee that publisher data sets traverse the network between any two instances of a content management server 202, 203, 204 exactly once if there exists a consumption application server 208 that has identified an interest in the data set. The publisher data set is not transmitted to a content management server that is not connected to a consumption application server 208 that has identified an interest in the publisher data set. This functionality allows the publisher data set to be copied across the network a minimum amount of times and may result in a large savings of network bandwidth, especially over WAN networks and the Internet. Advantageously, the content management servers 202, 203, 204 are also aware of one or more changes to connected consumption application servers 208 in real-time and adapt to these changes very quickly based on the registration process. FIG. 8 illustrates an example routing table used by content management servers 202, 203, 204. Further, for each publication registration process executed by a publication application server, and for each consumption registration process executed by a consumption entity, an entry is stored in a publication data set registration table.

In one embodiment, the content management servers 202, 203, 204 use optimized protocols between instances of content management servers that can be used to speed the transfer of data. This optimization may include using multiple network connections simultaneously allowing for parallel transmission of data and subsequent reassembly of data at receiving devices. Other techniques for transmitting data are also possible including, but not limited to, aggressive data compression, delta changes from previous transmissions, as well as others as a result of controlling and defining the behavior of both ends of the communication pipe.

The content management servers 202, 203, 204 may also allow for the addition of additional content management server instances at any time to the network of content management servers. In one embodiment, when a new content management server is added to the network, the newly added content management server initializes itself to a consistent state using any one of the currently online content management servers 202, 203, 204 to communicate with it in the network. In operation, the initialization only requires the identification of one other functioning instance of the content management server. Once initialized, other consumption application servers and publication application servers 206 can connect and process published data respectively as if all data was local to those operations.

Using the present system, users working on various computer devices including laptops, phones, tablets, etc can connect to the content management servers 202, 203, 204 directly and receive data from publisher entities in a similar way to other types of servers by executing the registration process and then retrieving data as if all publisher data sets where directly available. Advantageously, this feature allows broad dissemination of publisher data sets with entitled control and permissions. In addition, the ability to register for data and have that data delivered to a requesting device allows local applications to be developed that may process such data.

In one embodiment, as each instance of a content management server 202 for example, is brought online, the content management server 202 detects other content management servers 203, 204 configured in the system by broadcasting a find content management server message, which is replied to by other content management servers and/or a static configuration of dedicated computer devices indicating the existence of other content management servers. The reply from a content management server indicates which other content management servers are known by that instance. Upon connection of the content management server 202 to one or more content management servers, a list of content management servers configured in the system is provided to the connecting content management server. This enables the network of content management servers to be discovered whether or not they are online at a particular moment in time. This method also allows new content management servers to be added online and be known by all running content management servers quickly. Further, each content management server broadcasts its active state periodically so that the routing algorithms of content management servers can take that fact into account.

In one embodiment, content management servers transmit any changes to their internal databases. This may include, but is not limited to, lists of connected content management servers, registered publication application servers, registered consumption application servers, as well as connected user devices. This allows every content management server to have a complete inventory of connected devices in the network and to know the content management server to which they are connected. Conflict resolution for inconsistent updates concerning a same fact is resolved by the owning content management server to which the consumer application server or content management server is connected.

Figure 4:
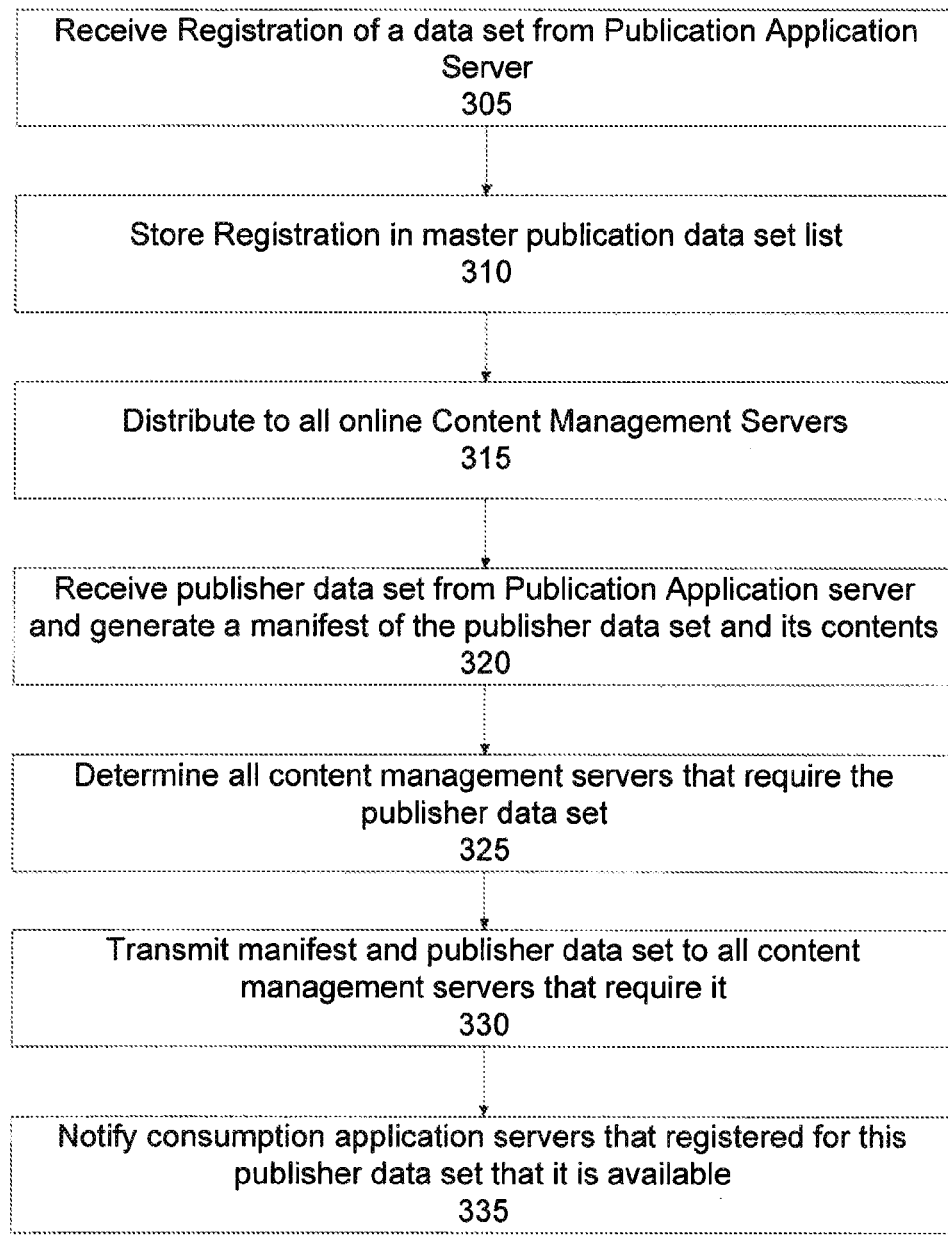
FIG. 4 illustrates an exemplary method of notifying a consumption entity of available data of interest.

Referring now to FIG. 4, an exemplary method of notifying a consumption entity of available data of interest is disclosed. First, at step 305, the content management server 202 receives publication registration (example shown in FIG. 5) concerning a publisher data set from a publisher entity, such as publication application server 206. Next, at step 310, the content management server 202 stores a copy of the registration data locally (i.e., caches the data) within the memory of the content management server 202, as illustrated in 310. In one embodiment, part of that registration data includes a data set identifier that uniquely identifies the publisher data set associated with this publication application server 208. Next, at step 315, the content management server 202 distributes the publication registration data to all other content management servers on the network. Next, at step 320, other registration fields are added to the publication registration data to facilitate advanced processing of the data from both a temporal and control point of view. At this point in the method, the content management server includes a publisher data set in its memory cache.

At step 325, the content management server 202 determines all other content management servers 204, connected devices 222, 224, and/or consumption application servers configured in the system. Based on this information, at step 330, the content management server 202 copies the publisher data set to other content management servers 204 associated with connected devices and connected consumption application servers. The copying between content management servers may utilize optimized protocols as described previously. Other techniques are also possible including aggressive data compression, delta changes from previous transmissions, as well as others as a result of defining the behavior of both ends of the communication pipe. Advantageously, this technique provides the benefit of only copying the data once between content management servers as well as copying the minimum amount of information. In other examples, the publisher data set may be transmitted to the content management server 202 prior to any registered request for the publisher data set. In this case, the publisher data set is not copied, but stored in non-cache memory until a registered interest is received.

Lastly, at step 335, the content management server 202 notifies one or more consumption application servers that the publisher data set of interest is available. In one embodiment, the publisher data set is transmitted to the content management server 202 when a new version of the publisher data set arrives. In this example, the publisher data set is transmitted to the content management server 202 when the publication application server 206 is notified that data has changed. In another embodiment, the publication application server 204 notifies the content management server 202 of the changed data. In response, the content management server 204 updates the copy of the corresponding publisher data set. In a further embodiment, the publication application server 206 notifies the content management server 202 after ensuring that data updates are on the server. The publication application server 206 then broadcasts an update notification to consumption entities, such as consumer application server 208. The update notification including a data set identifier identifying the publisher data set.

Figure 6:
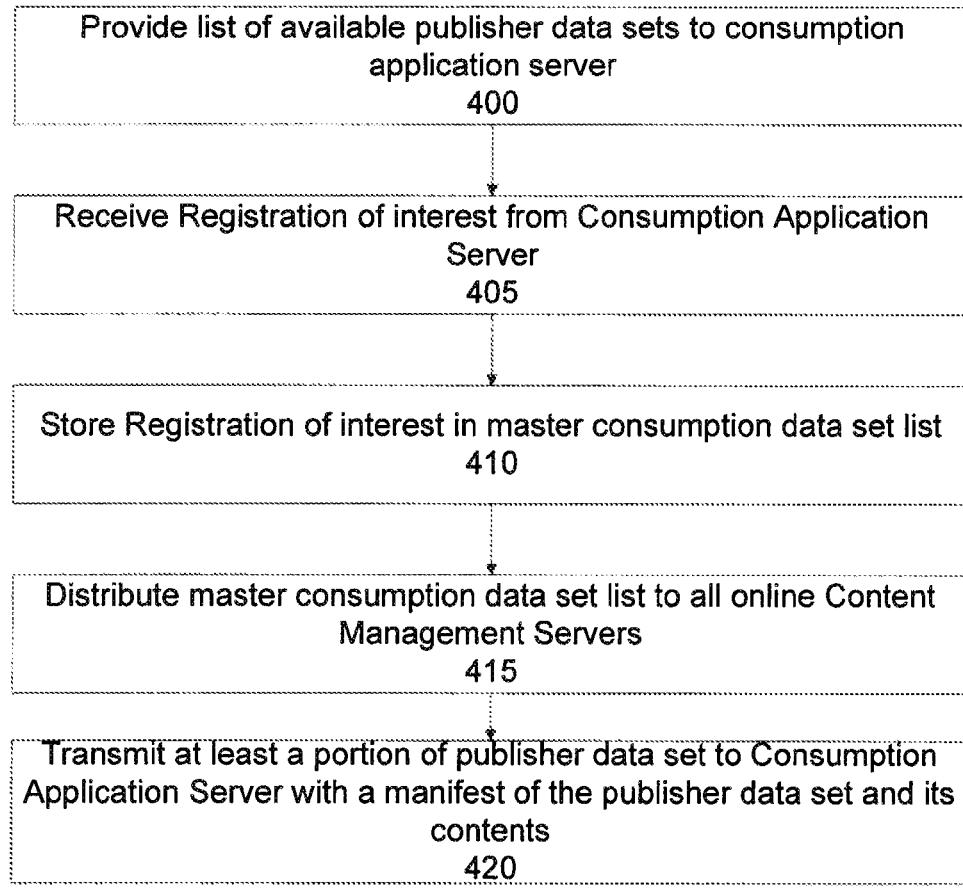
FIG. 6 illustrates an exemplary method for transmitting data to a consumption application server.

Turning now to FIG. 6, an exemplary method of transmitting data to a consumption entity is disclosed. First, at step 400, the consumption application server—retrieves a list of available publisher data sets and associated data set identifiers from a list of current publisher data sets provided by publication application servers. The consumption application server combines at least a portion of this information with permissions that the consumption application server has stored locally, and retrieves a corresponding list of available and entitled data sets. Using this list, the consumption application server then registers for one or more of the data sets with the content management server. Next, at step 405, when the content management server 202 receives a consumption registration (an example of which is shown in connection with FIG. 7) from a consumer application server interested in an available data set, the content management server stores a copy of the registration data locally (i.e., caches the data) within the memory of the content management server, as shown at step 410. Next, at step 415, the content management server distributes the available publisher data set to all other instances of the content management server on the network. Other registration fields may also be used to facilitate more advanced processing of the data from both a temporal and control point of view. Lastly, at step 420, the consumption application server receives any publisher data set that a publication application server registered in the current instance or any other content management server.

In one embodiment, if the data is available, the content management server 202 transmits the publisher data set to the consumption application server. If the publisher data set is not available, the content management server 202 waits for the publisher data set to be received. Once the publisher data set is received, the content management server transmits a notification to the consumption application server so that the data may be transferred to the consumption application server. The transmitting of new registration data in step 415 causes the content management server that is connected to the publication application server that publishes the publisher data set, to transmit the data set to the content management server associated with a consumption application server. In a further example, when new data arrives, the connected user can subscribe to be notified that new data is available. In another example, newly received data is pushed to the connected client on an existing open connection. This may reduce the time delay from when data is available to when it is consumed.

Referring back to FIG. 2, in some embodiments, publisher data sets stored on the content management server 202 may also include an expiration date and/or time in which the publisher data set should no longer be made available to consumption entities. In these embodiments, if the content management server 202 receives a request for a publisher data set and the publisher data set has expired, the content management server 202 does not transmit cached data to the consumption entity, but instead requests updated data from the content management server 202 in which the publication application server 206 is connected in order to refresh the publisher data set. The content management server 202 then transmits the updated publisher data set to the consumption entity. If the cached data is not expired, the content management server 202 transmits at least a portion of the cached data to the consumption entity. Various other techniques may be utilized by the content management server 202 to determine if cached entitled data is stale (e.g. has changed), and requires an update.

A publisher entity may also define a data retention policy for all copies of publisher data sets. For example, in one embodiment, since the content management server 202 is aware of all consumption entities and their patterns and intentions to access data, the window of time that the publisher data sets need to be available is computed, after which the data may be deleted. In another embodiment, often the lifetime of publisher data sets is not managed and therefore publisher data sets are accumulated until they are deleted by an administrator when a pre-determined amount of time has passed to reduce the chances of the publisher data set being needed after deletion. In this embodiment, the publisher data set is deleted at a fixed time after the last consumption entity has accessed the content. In one embodiment, if all consumption entities have de-registered their interest in a publisher data set, attempts to publish the data set by publisher entities to a content management server may be allowed, but such publisher entities receive an advisory notice that there are no consumption entities having an interest in the publisher data set. Further, the publisher data set is not be copied to any other content management server since there are no consumption application servers interested in the data set.

As shown in FIG. 2, in certain embodiments, the publication application server 206 may utilize the same (or similar) software as the content management server 202 to facilitate communication between the publication application server 206 and the content management server 202. For example, in one embodiment, the publication application server 206 may utilize web services to manage the subscriptions. In one embodiment, a remote user, such as user 222, may subscribe to the publication application server 206 to receive asynchronous updates of publisher data set information. In this embodiment, publication application server 206 may post data on a website using XML via HTTP to update the remote user. The publication application server 206 may also include a registration table in order to register and de-register remote users. In one embodiment, the publication application server 206 may supply a remote user with a URL to notify the remote user of new data published on the web service.

Advantageously, the publication application server 206 may also include a publish/subscribe table for managing the updates to the content management server 202. In one embodiment, the content management server 202 is added to the publisher/subscriber table. As data provided by a publisher entity changes, the content management server 202 is notified by the publication application server 206 that the publisher data set has changed. If the content management server 202 is connected to that publication application server 206, the cache may be updated at the content management server 202.

The publication application server 206 may also include a notification system. In at least one embodiment, referring to FIG. 2, the notification system may be physically located within the publication application server 206. When a user 222 or the content management server 202 subscribes to the publication application server 206 for updated data, the notification system may place an entry in the form of a request for updated data into an update notification queue. This queue may contain all data required to update a subscribed consumption entity, such as the content management server 202 or user 222. Upon placing a request into the queue, the entire queue may be checked for previous requests for the same data. If a previous request exists, that queue entry is updated rather than a creating a new entry. The queue may be implemented as a First In First Out (FIFO) queue. The notification software may transmit a notification to the subscriber that the data has updated and delete the corresponding queue entry. The notification system may also manage the number of notifications of updated data generated by the content management server 202. For example, the notification system may determine if a previous notification and later notification both exist and delete one of the notifications because that notification is no longer relevant. The queue management provided by the system can prevent duplicate notifications from occurring within a threshold frequency. For example, the queue management system may not allow a duplicate notification to occur within a predetermined time period (e.g., one minute). By preventing duplicate notifications from occurring, the number of requests to the content management server 202 may be reduced.

In one embodiment, upon receiving a notification of changed cached data from the publication application server 206, the content management server 202 may determine whether to invalidate (e.g., mark as stale) the portion of data in cache containing the old data, and/or request the updated data (e.g., asynchronously requested) for any known stale data from the publication application server 206 or the content management server 202. When the content management server 202 receives a request from a user 222 for data that is known to be stale, one of two responses may be provided. Depending on the timing of the new data updates and/or the consumption entity permissions of the requesting consumption entity, the content management server 202 may transmit an older version of the requested data to the consumption entity, or may delay the transmission of the requested publisher data set to the consumption entity until the updated data is received by the content management server 202. For example, the software application at the content management server 202 processing the consumption entity request may determine whether the user should be provided the updated data or whether the consumption entity should be transmitted the older data.

In one embodiment, upon the content management server 202 determining that at least a portion of the cached data is (or may be) stale, the content management server 202 requests updated data from the publication application server 206. If the publication application server 206 is unable to provide updated data to the content management server 202, the update request from the content management server 202 may remain in a request queue until the content management server 202 is able to process the request and transmit the updated data. In some embodiments, if the content management server 202 is unable to update the cache, the system transmits an alert notification to an administrator or monitoring facility associated with the publisher entity.

Referring to FIG. 2, in at least one embodiment, the content management server 202 uses a distributed cache. In this embodiment, a single server operates as a master server that manages notifications and updates the cache which may be distributed among multiple content management servers (or group of servers). Upon a failure event associated with the master content management server, another master content management server is selected from the group of servers.

Referring now to FIGS. 2 and 9, as described previously, at least an entitled portion of a publisher data set may be transmitted to a consumption entity based on a set of permissions associated with the consumption entity. Additionally, the portion of the publisher data set transmitted to the user may be further restricted or segmented depending on other characteristics of the consumption entity. For example, a consumption entity may be restricted to receiving less data based on the consumption entity's geographic location. In another embodiment, depending on the type of account the consumption entity has with the content management provider, the consumption entity may only have access to a select amount or type of data. Basing the response provided to the consumption entity from the content management server 202 is hereafter referred to as 'segmentation.' To utilize this type of segmentation, in one embodiment, a common set of codes is associated with a plurality of publisher data sets to define a set of permissions to those data sets. The set of permissions defined by the common set of codes may result in a consumption entity not being able to access data outside of the consumption entity's current region or country, or may restrict the publisher data set from consumption entities based on other characteristics. As shown in the FIG. 9 example, a consumption entity is associated with a set of permissions which is less than the total number of permissions needed to access every record in a publisher data set. The content management server 202 may process the publisher data set to remove records that require permissions that are not in the consumption entity's permission set. In one embodiment, the content management server 202 caches the result data set so that the data set may also be served to another consumption entity associated with an identical permission set. If a different consumption entity is associated with a permission set that is a subset of the permission set of the first consumption entity, then the result data set for the first consumption entity may be used as input for permission filtering.

It is to be understood that the invention is not limited in its application to the details of construction and the arrangement of the components and method steps set forth herein. The invention is capable of other embodiments and of being practiced or being carried out in various ways. Variations and modifications of the foregoing are within the scope of the present invention. For example, one of ordinary skill in the art will appreciate that the steps illustrated in the illustrative figures may be performed in other than the recited order, may be repeated, and that one or more steps illustrated may be optional in accordance with aspects of the disclosure. It should be understood that the invention disclosed and defined herein extends to all alternative combinations of two or more of the individual features mentioned and other embodiments evident from the text and/or drawings. All of these different combinations constitute various alternative aspects of the present invention. The embodiments described herein explain the best modes known for practicing the invention and will enable others skilled in the art to utilize the invention.

What is claimed is:

1. A content management server comprising:
   a processor; and
   a memory including:
      a first set of registrations received from publication application servers related to publisher data sets and a second set of registrations received from consumption application servers related to the publisher data sets, the first set of registrations and the second set of registrations being stored in a non-cache portion of the memory, wherein a routing algorithm of the content management server uses the first set of registrations to determine which of the publisher data sets are available on the content management server for access by the consumption application servers and uses the second set of registrations to route the publisher data sets from the publication application servers to the consumption application servers; wherein:
         the first set of registrations relating to the publisher data sets maintained in the publication application servers, each of the first set of registrations comprising a set of access permissions to access the publisher data sets, and a set of attributes of the publisher data sets including locations of alternate publication application servers available in a different locale to operate as a backup when any of the publication application servers is impaired and a first service level agreement (SLA) describing a minimum time period in which the publication application servers are to provide the publisher data sets at a frequency indicated by the publication application servers; and
         the second set of registrations relating to a set of registrations of interest and being associated with the consumption application servers, each of the set of registrations of interest identifying the publisher data sets of interest and attributes including locations of alternate consumption application servers in a different locale to operate as a backup when any of the consumption application servers is impaired and a second SLA describing a minimum time window in which the consumption application servers are to access the publisher data sets of interest at a frequency indicated by the consumption application servers, wherein the consumption application servers are separate devices from the publication application servers;
      a cache portion of the memory for receiving the publisher data sets from the publication application servers; and
      instructions that cause the processor to determine whether to transmit to a requesting consumption application server at least one portion of the publisher data sets from the cache portion of the memory prior to the publisher data sets being sent to the non-cache portion of the memory, said determination being based on whether at least the set of access permissions are verified for the requesting consumption application server; wherein the at least one portion of the publisher data sets is transmitted in chunks in parallel using multiple simultaneous network connections with reassembling on the requesting consumption application server.

2. The content management server of claim 1, wherein the memory further includes instructions that cause the processor to transmit the at least one portion of the publisher data sets.

3. The content management server of claim 2, wherein the at least one portion of the publisher data sets is accessed from the cache.

4. The content management server of claim 2, wherein the transmission of the at least one portion of the publisher data sets is performed asynchronously.

5. The content management server of claim 4, wherein the at least one portion of the publisher data sets is transmitted in anticipation of demand from one of the set of consumption application servers.

6. The content management server of claim 5, wherein the memory further includes instructions that cause the processor to determine if the publisher data sets in the cache is expired prior to transmitting the at least one portion of the publisher data sets.

7. The content management server of claim 1, wherein the at least one portion of the publisher data sets is accessed from the non-cache portion of the memory.

8. The content management server of claim 1, wherein the memory further includes instructions that cause the processor to remove the publisher data sets from the cache.

9. The content management server of claim 1, wherein the memory further includes instructions that cause the processor to transmit one copy of the publisher data sets for use by the set of consumption application servers, a subset of the set of consumption application servers located at a same geographical location.

10. The content management server of claim 1, further comprising an audit log, the audit log including transmission information associated with a demand for the publisher data sets.

11. The content management server of claim 1, wherein the memory further includes instructions that cause the processor to transmit a notification to one of the set of consumption application servers that the publisher data sets is available to be transmitted.

12. The content management server of claim 1, wherein the at least one portion of the publisher data sets is transmitted to at least one of the set of consumption application servers without downloading the publisher data sets from a publication application server.

13. The content management server of claim 1, wherein the memory further includes instructions that cause the processor to monitor whether a publication application server fails to publish expected data within a registered and configurable time period.

14. The content management server of claim 1, wherein the memory further includes instructions that cause the processor to transmit an alert upon one of the set of consumption application servers failing to retrieve the at least one portion of the publisher data sets within a registered and configurable time period.

15. The content management server of claim 1, wherein the memory further includes instructions that cause the processor to retrieve the publisher data sets from the alternate publication application servers in an event a main publication application server fails to provide the publisher data sets.

16. The content management server of claim 1, wherein the memory further includes instructions that cause the processor to transmit the publisher data sets to the alternate consumption application servers.

17. The content management server of claim 16, wherein the memory further includes instructions that cause the processor to receive updated data associated with the publisher data sets prior to an expiration of the publisher data sets in the cache.

18. The content management server of claim 1, wherein the content management server is further configured to:
receive a set of multiple requests each of which requests a set of common data from the publisher data sets;
retrieve a set of permissions corresponding to one consumption application server of the consumption application servers associated with the publisher data sets; and
transmit a first portion of the publisher data sets based on the set of permissions, the first portion of the publisher data sets different from a second portion of the publisher data sets to be transmitted.

19. The content management server of claim 1, wherein the memory further includes instructions that cause the processor to subscribe to a publication application servers to receive updates to the publisher data sets.

20. The content management server of claim 1, wherein transfer of the publisher data sets from the publication application servers to at least one of the consumption application servers requires at most one copy of the publisher data sets.

21. The content management server of claim 1, wherein the memory further includes instructions that cause the processor to subscribe to the publication application servers to receive updates to different versions of the publisher data sets in the cache when a version of the publisher data sets changes.

22. The content management server of claim 1, wherein the memory further includes instructions that cause the processor to support multiple versions of the publisher data sets to distribute to the consumption application servers simultaneously.

23. A system comprising:
a content management server comprising a processor and a memory including a cache portion and a non-cache portion, the content management server including:
a first set of registrations received from publication application servers related to publisher data sets and a second set of registrations received from consumption application servers related to the publisher data sets, the first set of registrations and the second set of registrations being stored in the non-cache portion of the memory of the content management server, wherein a routing algorithm of the content management server uses the first set of registrations to determine which of the publisher data sets are available on the content management server for access by the consumption application servers and uses the second set of registrations to route the publisher data sets from the publication application servers to the consumption application servers; wherein:
the first set of registrations relating to the publisher data sets maintained in the publication application servers, each of the first set of registrations comprising a set of access permissions to access the publisher data sets, and a set of attributes of the publisher data sets including locations of alternate publication application servers available in a different locale to operate as a backup when any of the publication application servers is impaired and a first service level agreement (SLA) describing a minimum time period in which the publication application servers are to provide the publisher data sets at a frequency indicated by the publication application servers; and the second set of registrations relating to a set of registrations of interest and being associated with the consumption application servers, each of the set of registrations of interest identifying the publisher data sets of interest and attributes including locations of alternate consumption application servers in a different locale to operate as a backup when any of the consumption application servers is impaired and a second SLA describing a minimum time window in which the consumption application servers are to access the publisher data sets of interest at a frequency indicated by the consumption application servers, wherein the consumption application servers are separate devices from the publication application servers;

the cache portion of the memory of the content management server for receiving the publisher data sets from the publication application servers; and said memory of the content management server including instructions that cause the processor of the content management server to determine whether to transmit to a requesting consumption application server at least one portion of the publisher data sets from the cache portion of the memory of the content management server prior to the publisher data sets being sent to the non-cache portion of the memory of the content management server, said determination being based on whether at least the set of access permissions are verified for the requesting consumption application server; wherein the at least one portion of the publisher data sets is transmitted in chunks in parallel using multiple simultaneous network connections with reassembling on the requesting consumption application server.

24. The system of claim 23, wherein the content management server receives updates to the publisher data sets from the alternate publication application servers if a primary publication application server is unavailable or impaired.

25. A computer-implemented method comprising:
receiving, by a memory of a content management server from publication application servers, a first set of registrations related to publisher data sets;
receiving, by the memory of the content management server from consumption application servers, a second set of registrations related to the publisher data sets;
storing, in a non-cache portion of the memory of the content management server, the first set of registrations and the second set of registrations, wherein a routing algorithm of the content management server uses the first set of registrations to determine which of the publisher data sets are available on the content management server for access by the consumption application servers and uses the second set of registrations to route the publisher data sets from the publication application servers to the consumption application servers; wherein:
the first set of registrations relating to the publisher data sets maintained in the publication application servers, each of the first set of registrations comprising a set of access permissions to access the publisher data sets, and a set of attributes of the publisher data sets including locations of alternate publication application servers available in a different locale to operate as a backup when any of the publication application servers is impaired and a first service level agreement (SLA) describing a minimum time period in which the publication application servers are to provide the publisher data sets at a frequency indicated by the publication application servers; and the second set of registrations relating to a set of registrations of interest and being associated with the consumption application servers, each of the set of registrations of interest identifying the publisher data sets of interest and attributes including locations of alternate consumption application servers in a different locale to operate as a backup when any of the consumption application servers is impaired and a second SLA describing a minimum time window in which the consumption application servers are to access the publisher data sets of interest at a frequency indicated by the consumption application servers, wherein the consumption application servers are separate devices from the publication application servers;

receiving, by a cache portion of the memory of the content management server, the publisher data sets from the publication application servers; and determining, by the content management server, whether to transmit to a requesting consumption application server at least one portion of the publisher data sets from the cache portion of the memory of the content management server prior to the publisher data sets being sent to the non-cache portion of the memory of the content management server, said determination being based on whether at least the set of access permissions are verified for the requesting consumption application server; wherein the at least one portion of the publisher data sets is transmitted in chunks in parallel using multiple simultaneous network connections with reassembling on the requesting consumption application server.

26. The method of claim 25, further comprising:
determining, by the content management server, if the publisher data sets in the cache portion of the memory of the content management server is expired before transmitting the publisher data sets to one of the consumption application servers.

27. The method of claim 25, further comprising:
communicating with the publication application servers to receive, by the content management server, updated publisher data sets;
receiving, by the content management server, the updated publisher data sets asynchronously; and
replacing, by the content management server, the publisher data sets with the updated publisher data sets.

28. The method of claim 25, wherein comparing, by the content management server, the request to the set of permissions associated with the requesting consumption application server comprises requesting and receiving, by the content management server from a publication application server, the set of permissions associated with the requesting consumption application server.

* * * * *